(12) United States Patent
Hu

(10) Patent No.: US 8,449,168 B2
(45) Date of Patent: May 28, 2013

(54) INTELLIGENT AND ENERGY-SAVING LED LAMP WITH GLIMMER AND FULL LIGHT EMISSION

(76) Inventor: Wen-Sung Hu, Tainan (TW)

( * ) Notice: Subject to any disclaimer, the term of this patent is extended or adjusted under 35 U.S.C. 154(b) by 206 days.

(21) Appl. No.: 13/154,517

(22) Filed: Jun. 7, 2011

(65) Prior Publication Data

US 2012/0313533 A1 Dec. 13, 2012

(51) Int. Cl.
*H01R 33/00* (2006.01)
*F21V 23/04* (2006.01)

(52) U.S. Cl.
USPC .................... 362/642; 362/276; 362/802

(58) Field of Classification Search
USPC ............... 362/249.02, 642, 802, 276, 640, 362/650; 315/152
See application file for complete search history.

(56) References Cited

U.S. PATENT DOCUMENTS

| | | | | |
|---|---|---|---|---|
| 4,692,848 A | * | 9/1987 | Poyer | 362/216 |
| 5,442,532 A | * | 8/1995 | Boulos et al. | 362/276 |
| 6,013,985 A | * | 1/2000 | Green et al. | 315/149 |
| 6,568,833 B2 | * | 5/2003 | Worgan et al. | 362/247 |
| 6,573,659 B2 | * | 6/2003 | Toma et al. | 315/149 |
| 6,943,687 B2 | * | 9/2005 | Lee et al. | 340/556 |
| 6,956,493 B1 | * | 10/2005 | Youngblood | 340/693.9 |
| 7,438,438 B2 | * | 10/2008 | Sandell | 362/276 |

* cited by examiner

*Primary Examiner* — John A Ward
(74) *Attorney, Agent, or Firm* — Alan Kamrath; Kamrath IP Lawfirm, P.A.

(57) ABSTRACT

An intelligent and energy-saving LED lamp with glimmer and full light emission includes a lamp holder and a LED substrate disposed in the lamp holder. A plurality of LEDs is provided on the LED substrate. An infra-red sensing device with an infra-red detecting head is disposed inside the lamp holder. A lampshade is connected to a top end of the lamp holder and includes a protruding cover corresponding to the infra-red detecting head. The LEDs do not light up when there is enough light from external surrounding. The LEDs radiates a glimmering light when there is not enough light from external surrounding and the infra-red detecting head does not sense any movements of objects. The LEDs radiates a full light when there is not enough light from external surrounding and the infra-red detecting head senses movements of objects.

4 Claims, 15 Drawing Sheets

US 8,449,168 B2

INTELLIGENT AND ENERGY-SAVING LED LAMP WITH GLIMMER AND FULL LIGHT EMISSION

BACKGROUND OF THE INVENTION

1. Field of the Invention

The present invention relates to a LED lamp and, more particularly, to an intelligent and energy-saving LED lamp with glimmer and full light emission.

2. Description of the Related Art

Energy saving and carbon reduction are the most important issues in tackling effects of global warming. Science and technology talents from countries worldwide continue to develop energy-saving lamps to save electricity and energy. Some common household lamps are equipped with infra-red sensors to meet the purpose of saving electricity. However, wiring for lamps which can radiate glimmer of light and is equipped with an infra-red sensor has already been layout when new homes are built and decorated. For old homes, wiring for infra-red sensors has to be exposed on walls which will affect the overall look of the home deco. Electricians, cementers, painters and decoration workers will have to be hired if you want the deco to look nice. It is a waste of manpower and resources which surpassing the effects of electric-saving itself. Furthermore, common electric-saving lamps do not radiate light during power failure so that households have to equip with emergency lights.

BRIEF SUMMARY OF THE INVENTION

Therefore, it is an objective of the present invention to overcome the aforementioned shortcoming and deficiency of the prior art by providing an intelligent and energy-saving LED lamp with glimmer and full light emission. The intelligent and energy-saving LED lamp can be adapted to indoors lamp sockets for electricity supply to achieve the purpose of easy installation. Electric power for the LED lamp is turned off during daytime, and will radiate 30% of light intensity at night time without humans passing by and 100% of light intensity when humans pass by at nighttime. Thus, the purposes of saving electricity and enhancing safety are achieved. Furthermore, the LED lamp can also be used as a torch for convenience of fleeing from calamity at nighttime.

The intelligent and energy-saving LED lamp of the present invention includes a lamp holder, a control plate, a LED substrate, an infra-red sensing device, and a lampshade. The lamp holder includes a top end and a bottom end. An opening is formed in the top end and a lamp head is disposed on the bottom end of the lamp holder. An actuator is installed in the lamp holder and located above the lamp head. The control plate is supportedly installed in the lamp holder and has a control circuit connected electrically to the actuator. The LED substrate is supportedly disposed inside the lamp holder and electrically connected to the control circuit of the control plate. The LED substrate includes an upper side facing the opening of the lamp holder and a lower side facing the lamp head. A plurality of LEDs is disposed on the upper side of the LED substrate. The LED substrate further includes a hole extending from the upper side through the lower side of the LED substrate. The infra-red sensing device is disposed inside the lamp holder and electrically connected to the control circuit. The infra-red sensing device includes an infra-red detecting head disposed on an upper end thereof. The infra-red detecting head extends through the hole of the LED substrate and protrudes above the upper side of the LED substrate. The infra-red sensing device includes a sensing circuit for cutting off electric in full light environment, radiating glimmer in environment of low light intensity, and actuating 100% of full light when the infra-red sensing device senses movements of objects. The lampshade is connected to the top end of the lamp holder and covers the opening of the lamp holder. The lampshade includes a protruding cover formed on an outer end of the lampshade and corresponding to the infra-red sensing device. The plurality of LEDs do not radiate when there is enough light from external surrounding; the actuator actuates the plurality of LEDs to radiate only a preset percentage of light when there is not enough light from external surrounding and the infra-red detecting head does not sense any movements of objects; the plurality of LEDs radiates a full light when there is not enough light from external surrounding and the infra-red detecting head senses movement of objects.

In a preferred form, the intelligent and energy-saving LED lamp further includes a sonic emitter, a sonic receiver, and a LED indicator lamp. The sonic emitter is disposed on the lamp holder and connected electrically to a 100% full light electric circuit of the infra-red sensing device. The sonic receiver receives signals from the sonic emitter, and the LED indicator lamp blinks when the LEDs radiate a 100% full light.

In another preferred form, the intelligent and energy-saving LED lamp further includes a camera and a monitor connected electrically to the camera. The camera is disposed on the lamp holder to screen the external surrounding to be shown in the monitor.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
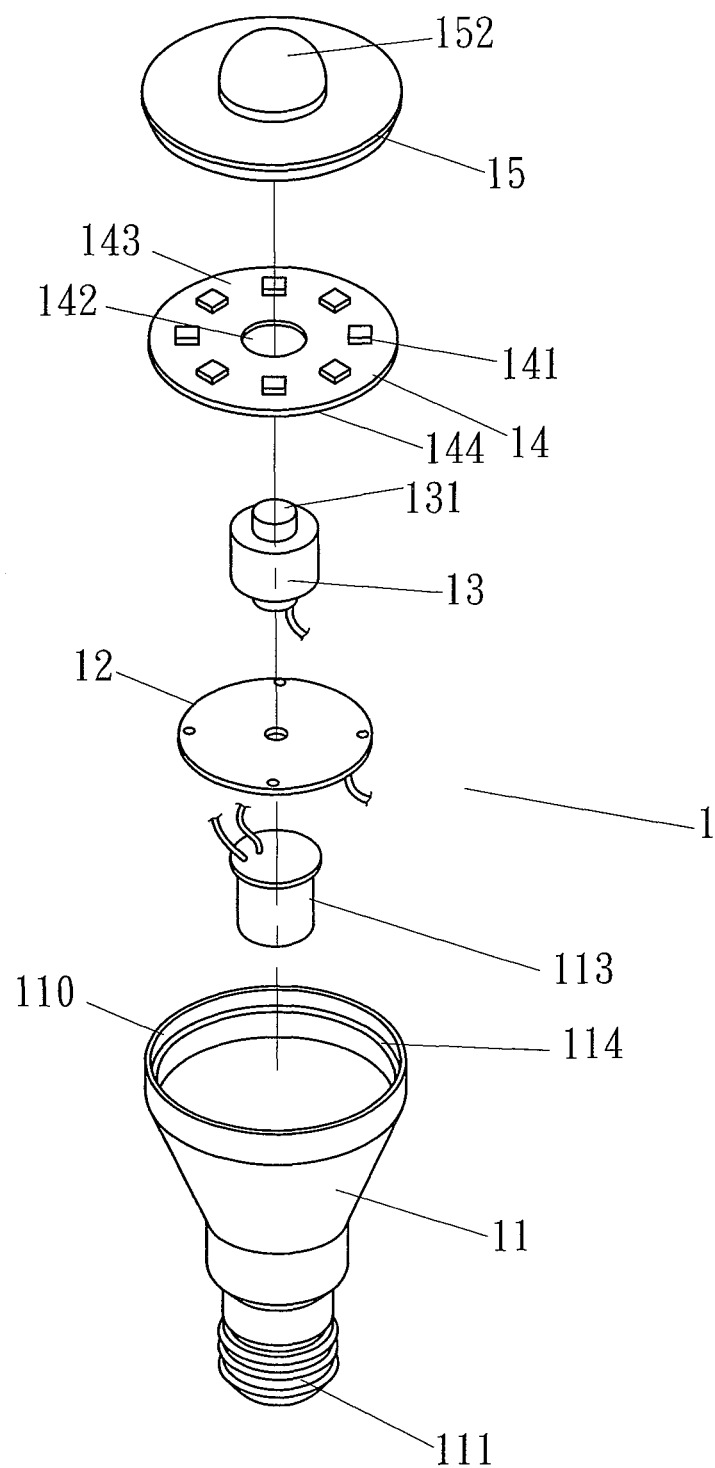
FIG. 1 is an exploded perspective view of an intelligent and energy-saving LED lamp of a first preferred embodiment of the present invention.
Figure 2:
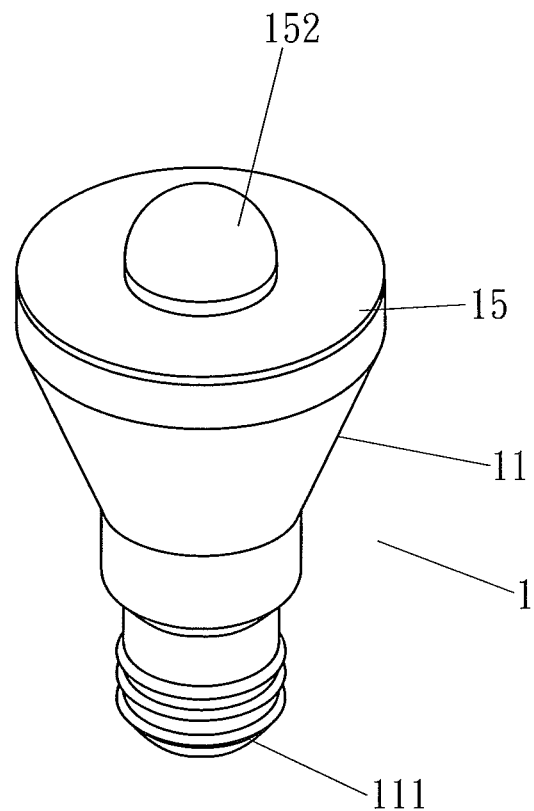
FIG. 2 is a perspective view of the LED lamp of FIG. 1.
Figure 3:
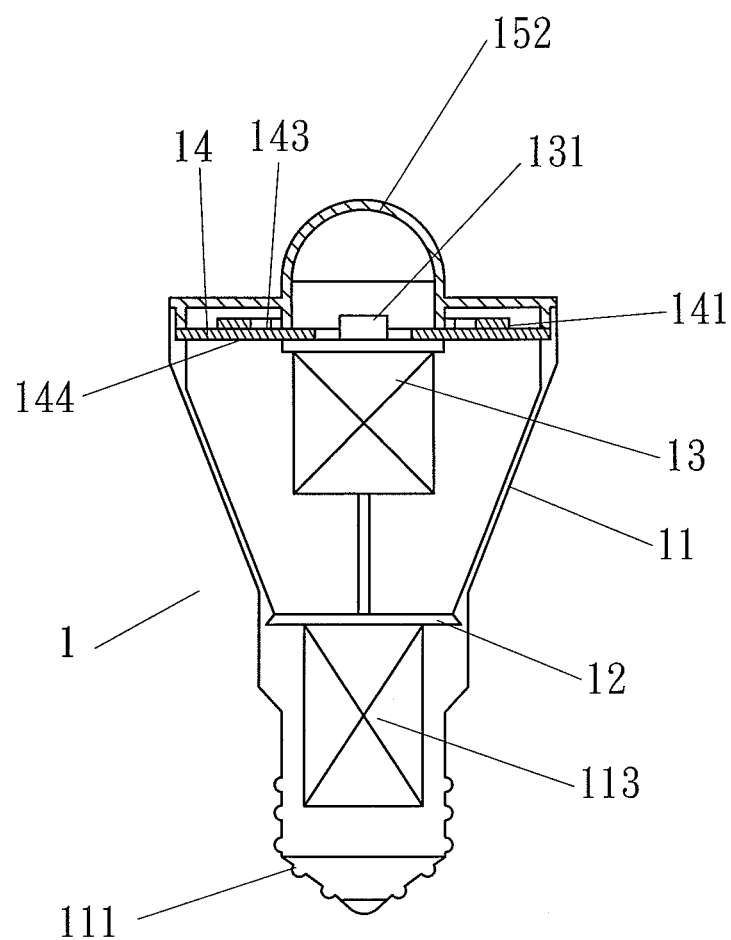
FIG. 3 is a cross-sectional view of the LED lamp of FIG. 2.

An intelligent and energy-saving LED lamp of a first embodiment of the present invention is shown in FIGS. 1 through 3 of the drawings and generally designated 1. The LED lamp 1 includes a lamp holder 11, a control plate 12, a LED (light-emitting diode) substrate 14, an infra-red sensing device 13, and a lampshade 15. The lamp holder 11 is designed as a receptacle shape for convenience of holding by hands. An opening 110 is formed in a top end of the lamp holder 11, and a lamp head 111 is disposed on a lower end of the lamp holder 11. An actuator 113 is installed inside the lamp holder 11 and disposed above the lamp head 111. A circular support 114 is disposed on an inner side of the top end of the lamp holder 11.

The control plate 12 is disposed supportedly inside the lamp holder 11 and connected to the actuator 113 electrically. A control circuit is disposed on the control plate 12 for controlling the on or off state of actuator 113.

The LED substrate 14 is disposed inside the lamp holder 11 and supported by the circular support 114. The LED substrate 14 is connected electrically to the control circuit of the control plate 12. The LED substrate 14 includes an upper side 143 facing the opening 110 of the lamp holder 11 and a lower side 144 facing the lamp head 111. A plurality of LEDs 141 is disposed on the upper side 143 of the LED substrate 14. The LED substrate 14 further includes a hole 142 extending from the upper side 143 through the lower side 144 of the LED substrate 14. In this embodiment, the hole 142 acts as a center for the LEDs 141 disposed around it.

The infra-red sensing device 13 is located inside the lamp holder 11 and connected electrically to the control circuit of the control plate 12. In this embodiment, the infra-red sensing device 13 is mounted on the lower side 144 of the LED substrate 14. An infra-red detecting head 131 is provided on an upper end of the infra-red sensing device 13. The infra-red detecting head 131 extends through hole 142 of the LED substrate 14 and protrudes above the upper side 143 of the LED substrate 14. The infra-red sensing device 13 includes a sensing circuit for cutting off electric in full light environment, radiating glimmer in environment of low light intensity, and actuating 100% of full light when sensing movements of objects. Namely, infra-red sensing device 13 can detect the light intensity of external environment and convert light signals into electric signals, as well as detect the movements of objects in external environment.

The lampshade 15 is connected to the top end of the lamp holder 11 and covers the opening 110 of the lamp holder 11. A round protruding cover 152 corresponding to the infra-red sensing device 13 in a vertical direction is provided on an outer end of the lampshade 15. In this embodiment, the protruding cover 152 is disposed at a center of the lampshade 15 and is integrally formed with the lampshade 15 as a single member. Nevertheless, the protruding cover 152 can also be formed separately and connected to the lampshade 15, and is not limited to be disposed at the center of the lampshade 15.

Figure 4:
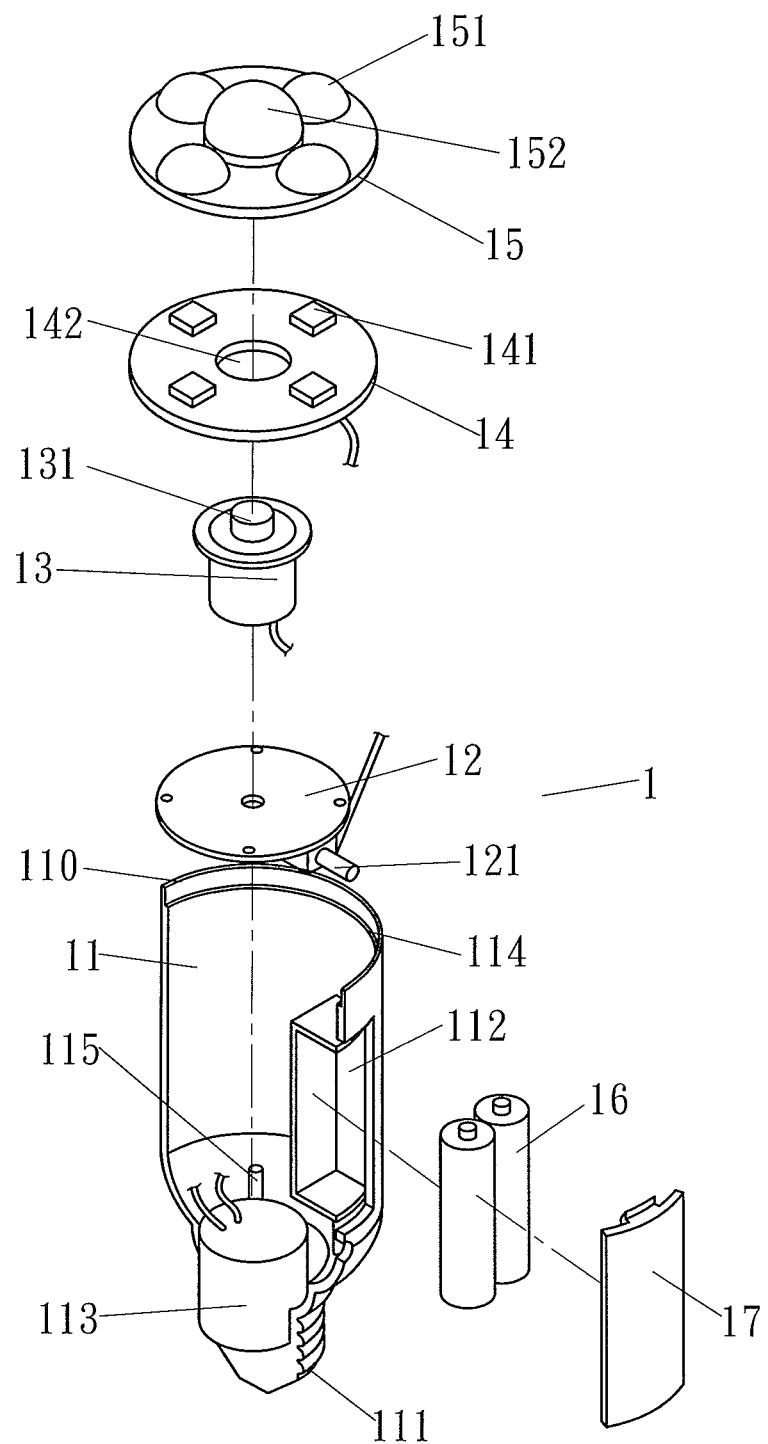
FIG. 4 is an exploded perspective view of an intelligent and energy-saving LED lamp of a second preferred embodiment of the present invention.
Figure 5:
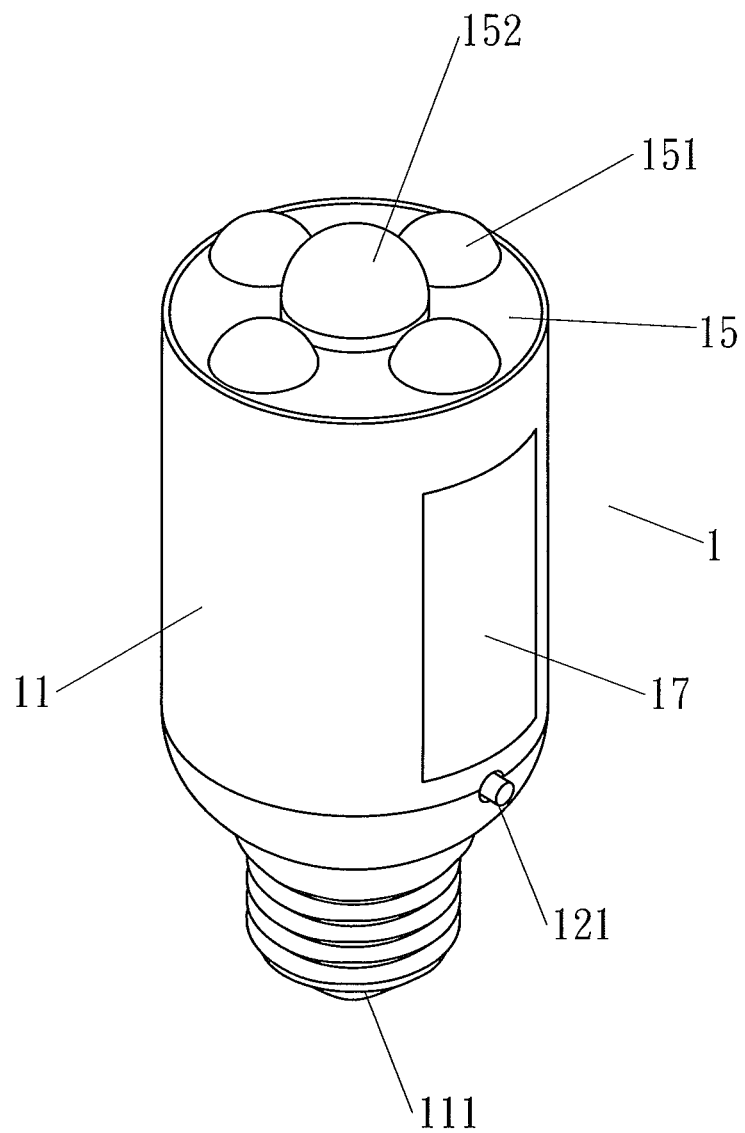
FIG. 5 is a perspective view of the LED lamp of FIG. 4.
Figure 6:
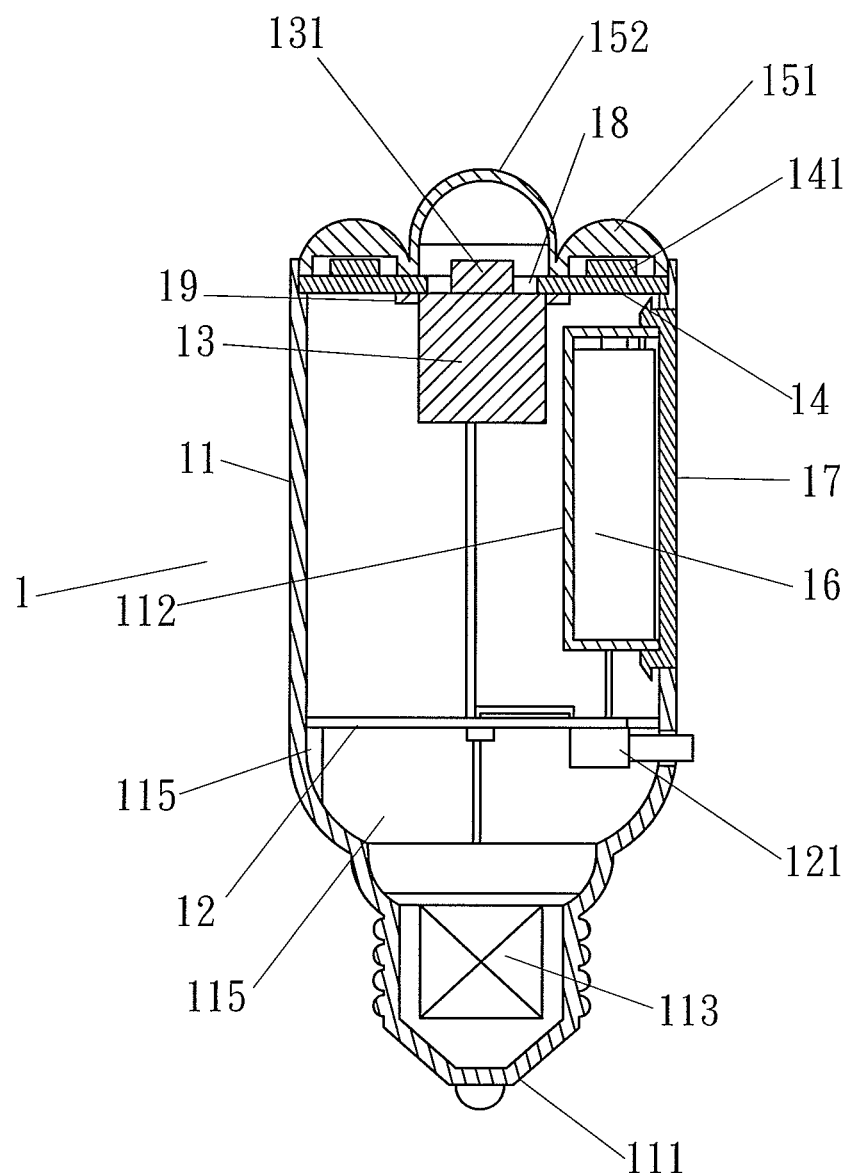
FIG. 6 is a cross-sectional view of the LED lamp of FIG. 5.
Figure 7:
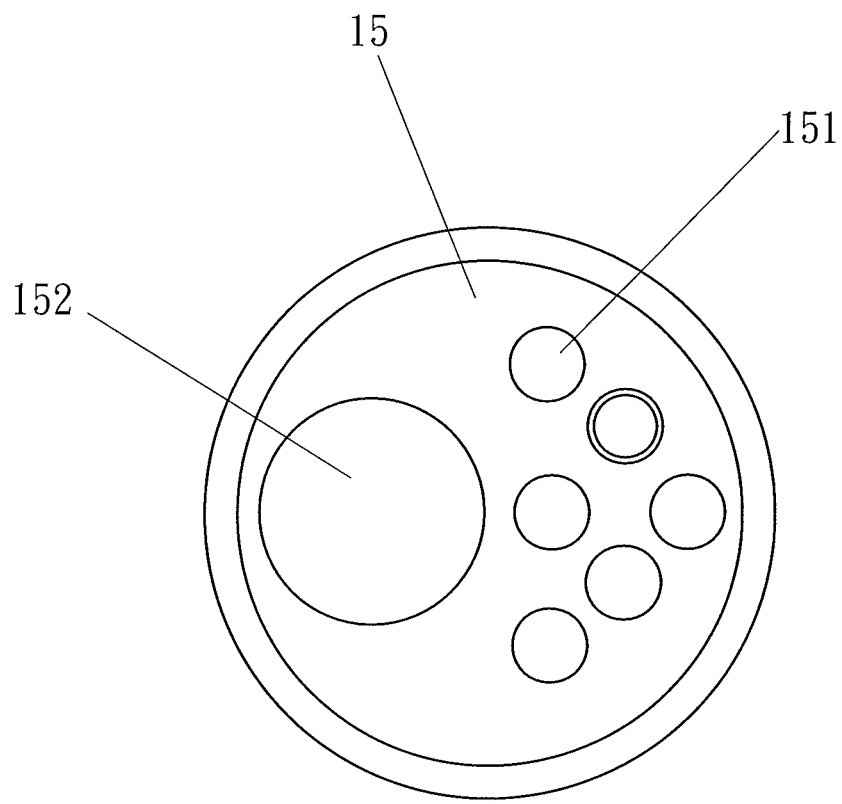
FIG. 7 is a schematic view of a lamp holder of a LED lamp of another preferred embodiment of the present invention.

An intelligent and energy-saving LED lamp 1 of a second preferred embodiment of the present invention is shown in FIGS. 4 through 6 and includes a lamp holder 11, a control plate 12, a LED substrate 14, an infra-red sensing device 13, and a lampshade 15. Description of the parts of the LED lamp 1 shown in FIG. 4 identical to those shown in FIG. 1 is omitted. In this embodiment, the lamp holder 11 is in cylindrical shape with a battery chamber 112 disposed on a side wall thereof for accommodating batteries 16. The control plate 12 has a battery converting switch 121 for connecting electrically to the batteries 16. A battery cover 17 is provided for covering the battery chamber 112. A plurality of securing posts 115 is disposed inside the lamp holder 11 for installing and securing the control plate 12. A plurality of convex lenses 151 corresponding to the LEDs 141 in the vertical direction is formed on the outer end of the lampshade 15. In this embodiment, the protruding cover 152 acts as a center for the convex lenses 151 disposed surrounding it. However, the convex lenses 151 are not limited to be disposed surrounding the protruding cover 152. As shown in FIG. 7, the protruding cover 152 corresponding to the infra-red sensing device 13 is disposed on one side away from the center of the lampshade 15. The convex lenses 151 are disposed on the opposite side away from the center of the lampshade 15. Furthermore, the convex lenses 151 can also be convex lenses for adjusting light and focus. The bottom surfaces of the convex lenses 151 can be matte finished or covered with matte paper to radiate even light intensity.

Figure 8:
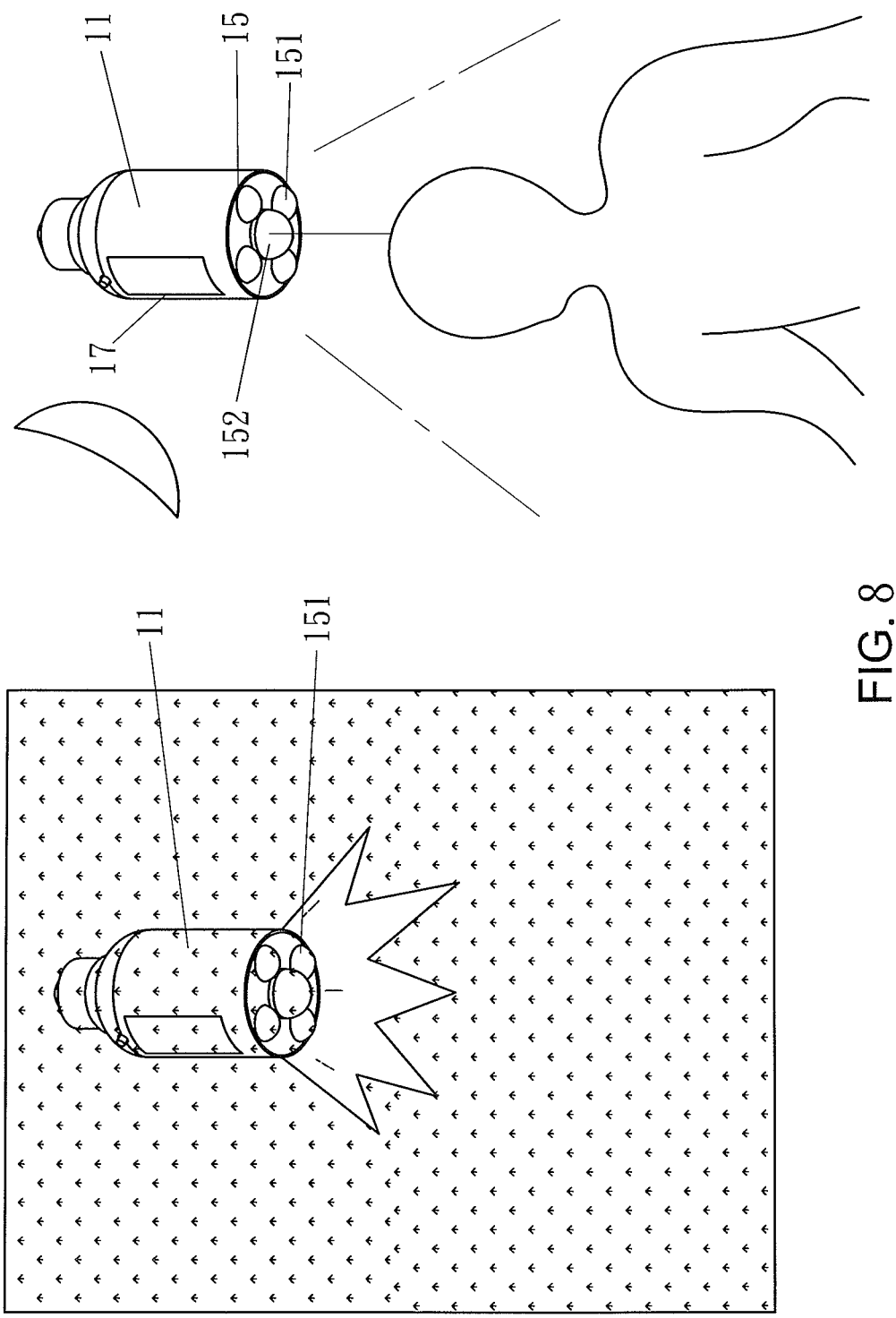
FIG. 8 shows a usage illustration of the LED lamp of FIG. 5.

As shown in FIG. 8, the intelligent and energy-saving LED lamp 1 can be connected to a socket by the lamp head 111 of the lamp holder 11 to get electricity. When electric is provided for the LED lamp 1, the control circuit of the control plate 12 can control whether the LEDs 141 light up or not according to the light intensity of external surrounding. Specifically, when the infra-red sensing device 13 detects there is enough light from external surrounding, e.g. in daytime, the electric to the LEDs 141 will be cut off by the control circuit of the control plate 12; when the infra-red sensing device 13 detects there is not enough light from external surrounding, e.g. in night time, and the infra-red detecting head 131 does not detect any humans in the detecting range, the actuator 113 will actuate the LEDs 141 to radiate a preset intensity of light, e.g. 10%~50%; when the infra-red sensing device 13 detects there is not enough light from external surrounding, e.g. in night time, and the infra-red detecting head 131 detects the presence of humans in the detecting range, the actuator 113 will actuate the LEDs 141 to radiate a 100% full light. Light radiated from the LEDs 141 can be enhanced for better lighting effects by the convex lenses 151 of the lampshade 15. Furthermore, when humans are away from the detecting range of the infra-red detecting head 131, the LEDs 141 will revert to 10%~50% of light intensity to achieve the purposes of saving electricity and providing safety for humans. Further, the batteries 16 will be charged when the LED lamp 1 is connected to indoors electrical power. The batteries 16 provide electricity for the LEDs 141 during blackout to continue the three lighting functions mentioned previously. Power for the batteries 16 can be turned off by using the battery converting switch 121.

Figure 9:
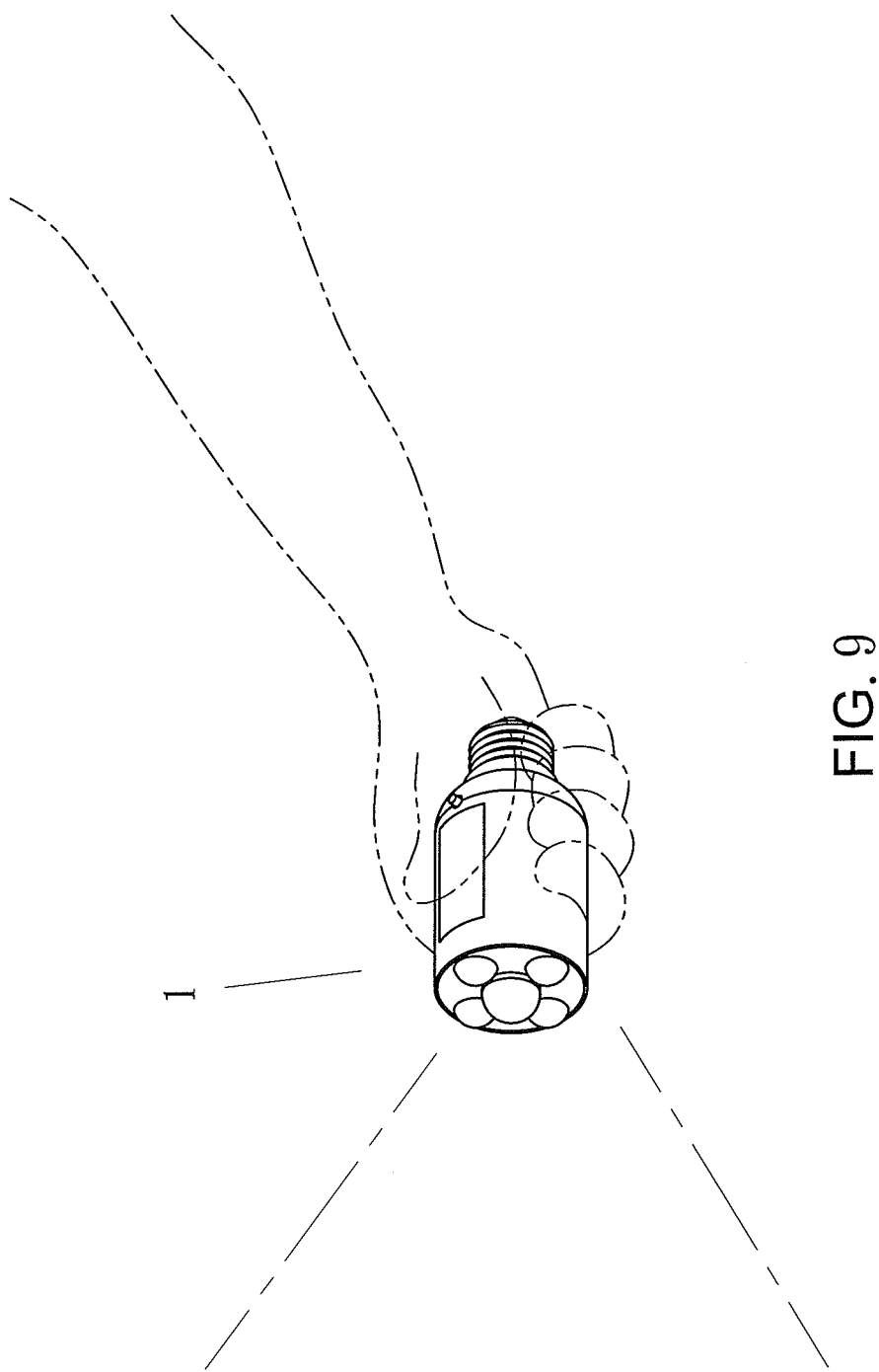
FIG. 9 shows another usage illustration of the LED lamp of FIG. 5.

As shown in FIG. 9, the intelligent and energy-saving LED lamp 1 can be disconnected from the socket to be used as a torch when there is a blackout.

The intelligent and energy-saving LED lamp 1 of the present invention has the below advantages:

(1) The lamp head 111 of the LED lamp 1 can be connected to sockets for common light equipment. It is not necessary to do wiring for adding extra infra-red sensing devices. There is no need to hire electricians, painters, cementers, and decoration workers for the sake of keeping the deco overall look, in order to save manpower, resources and time.

(2) The LED lamp 1 can detect if there is enough light from external environment by using the infra-red sensing device 13, in order to generate visible glimmer or light of high intensity. Thus, the LED lamp 1 can provide optimum energy-saving effects. The LED lamp 1 can also be used at doors outside and inside buildings, outside and inside garages, outside backdoors, and in hallways. The differences of light intensity can warn and scare away thieves for human safety.

(3) The batteries 16 provide electricity during blackout for easy identifying a location of the LED lamp 1 when there is an emergency in order to enhance safety.

Figure 10:
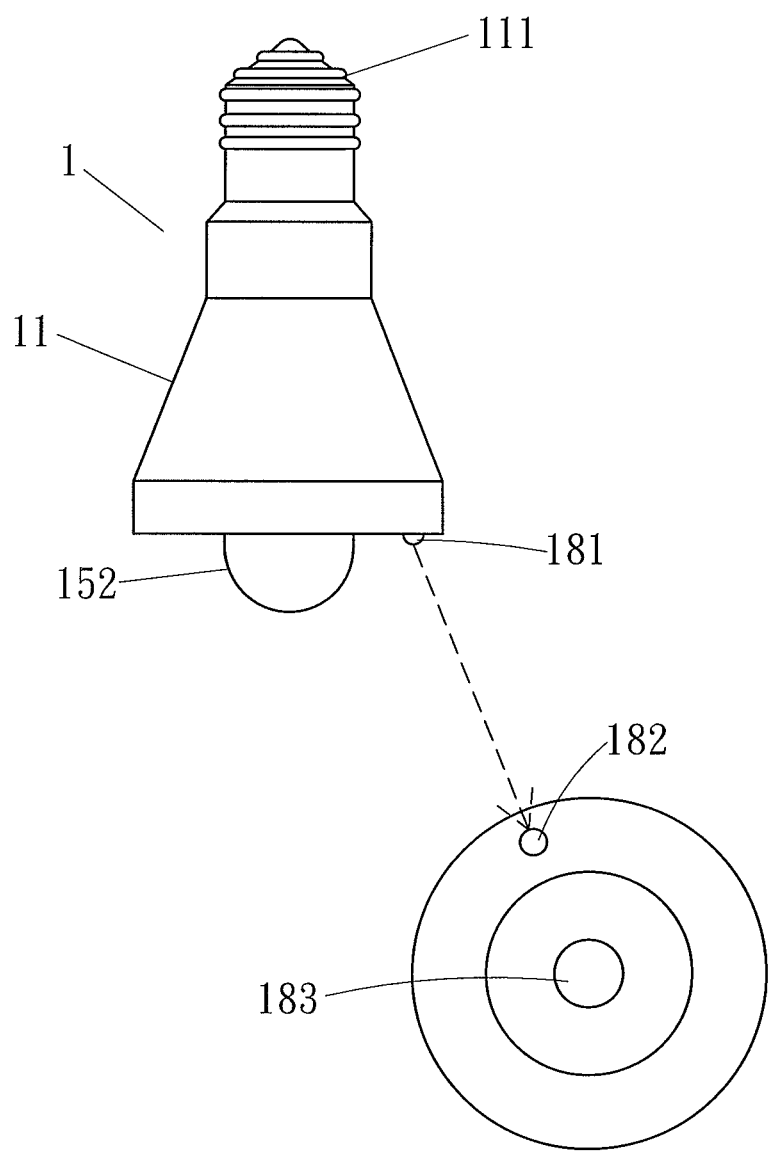
FIG. 10 is a schematic view of an intelligent and energy-saving LED lamp of the present invention including a sonic emitter.
Figure 11:
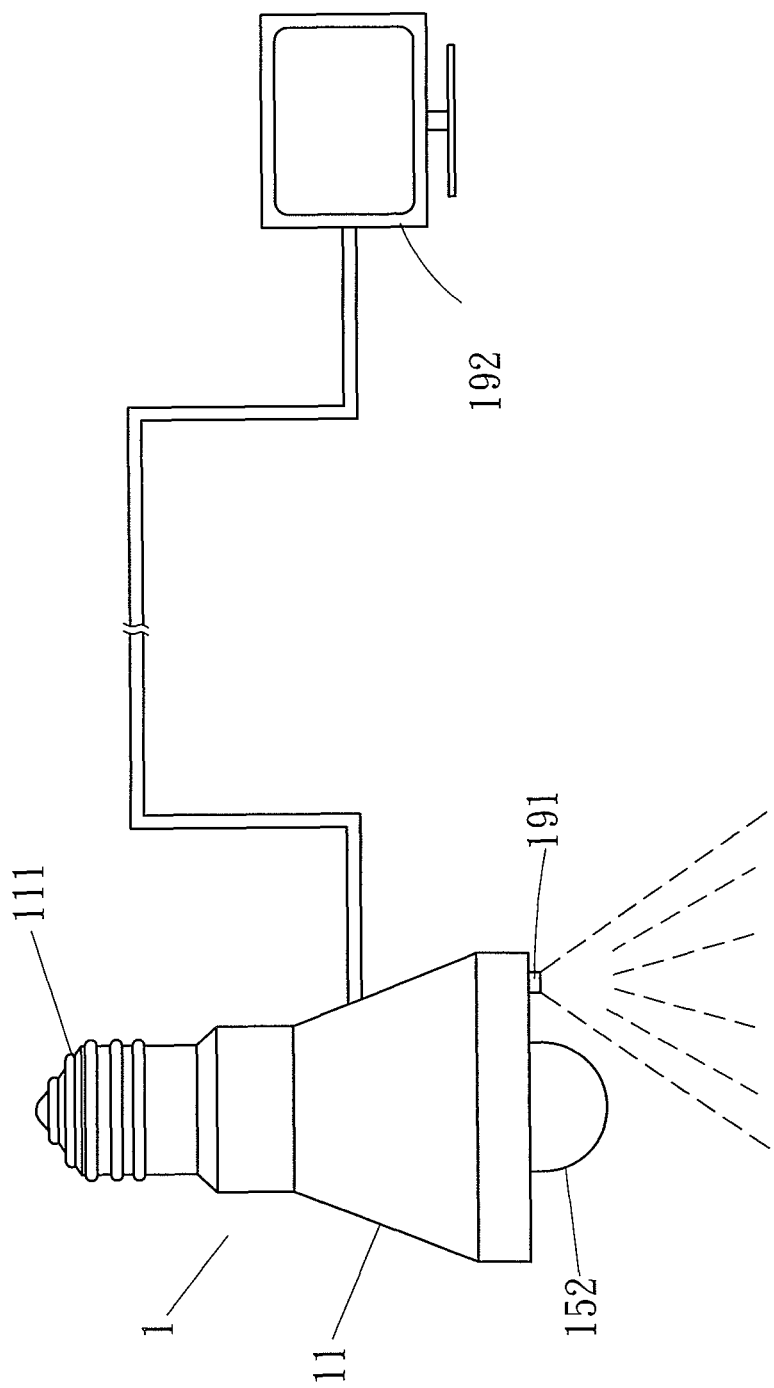
FIG. 11 is a schematic view of an intelligent and energy-saving LED lamp of the present invention including a camera.
Figure 12:
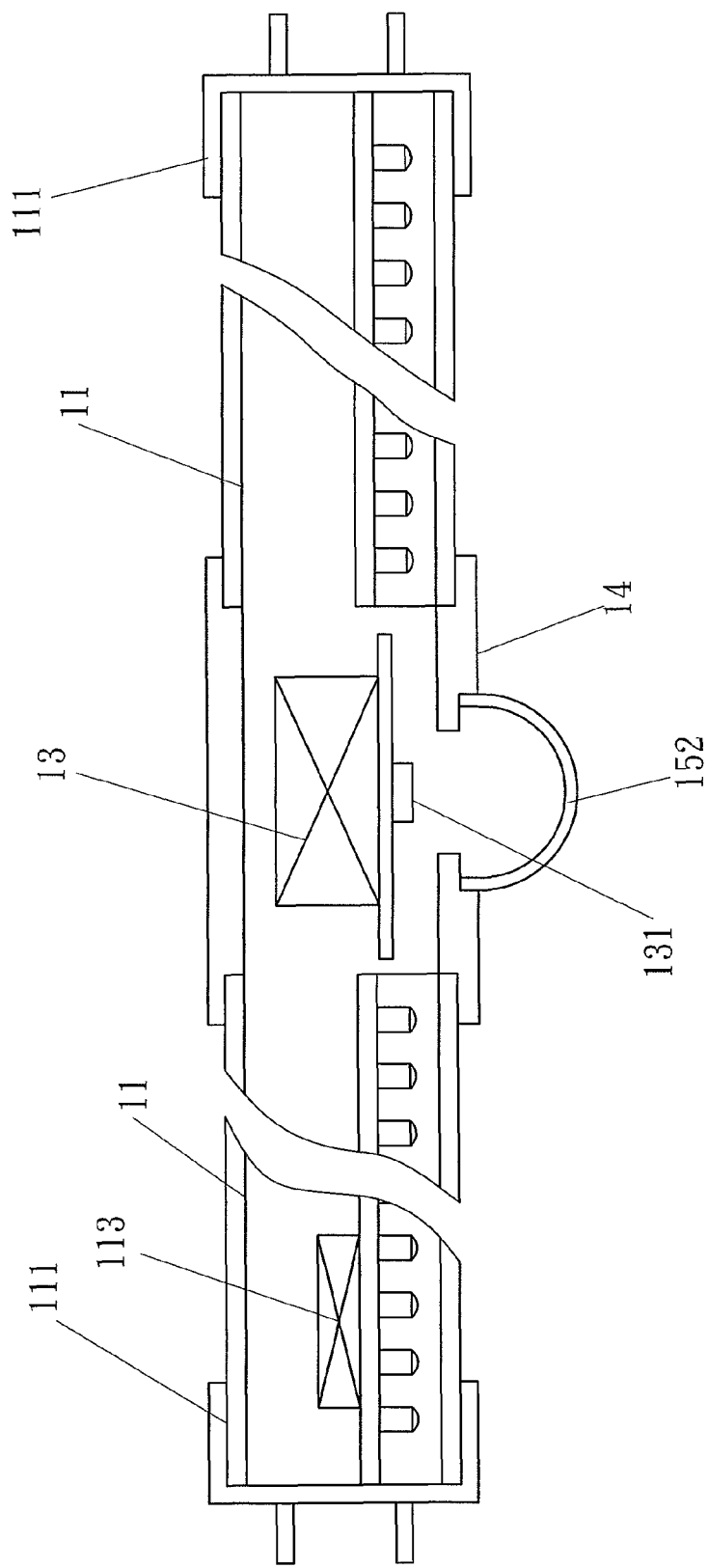
FIG. 12 is a schematic view of a LED lamp of the present invention applied in a fluorescent tube.
Figure 13:
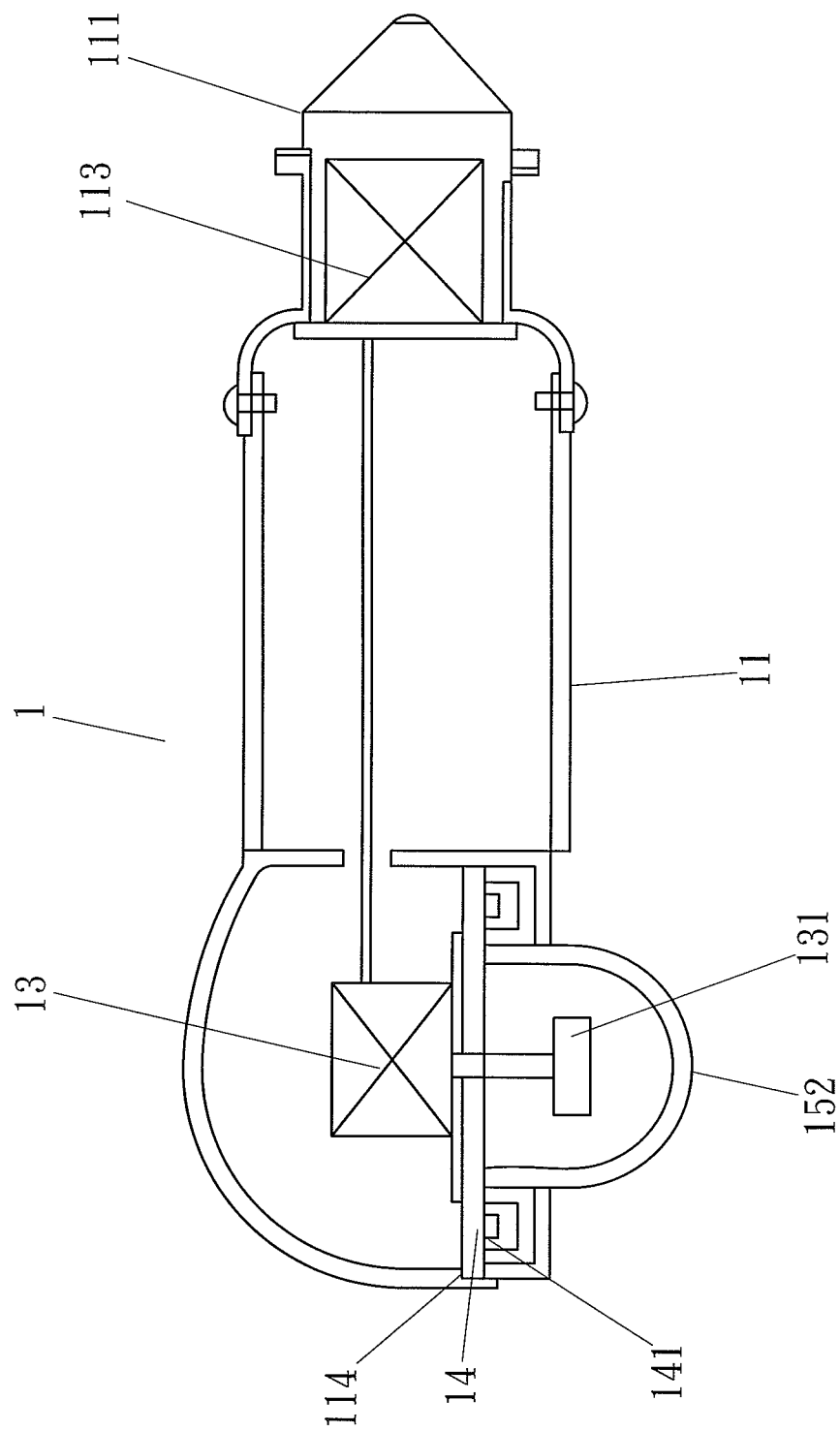
FIG. 13 is a schematic view of a LED lamp of the present invention applied in a horizontal projecting type LED tube.
Figure 14:
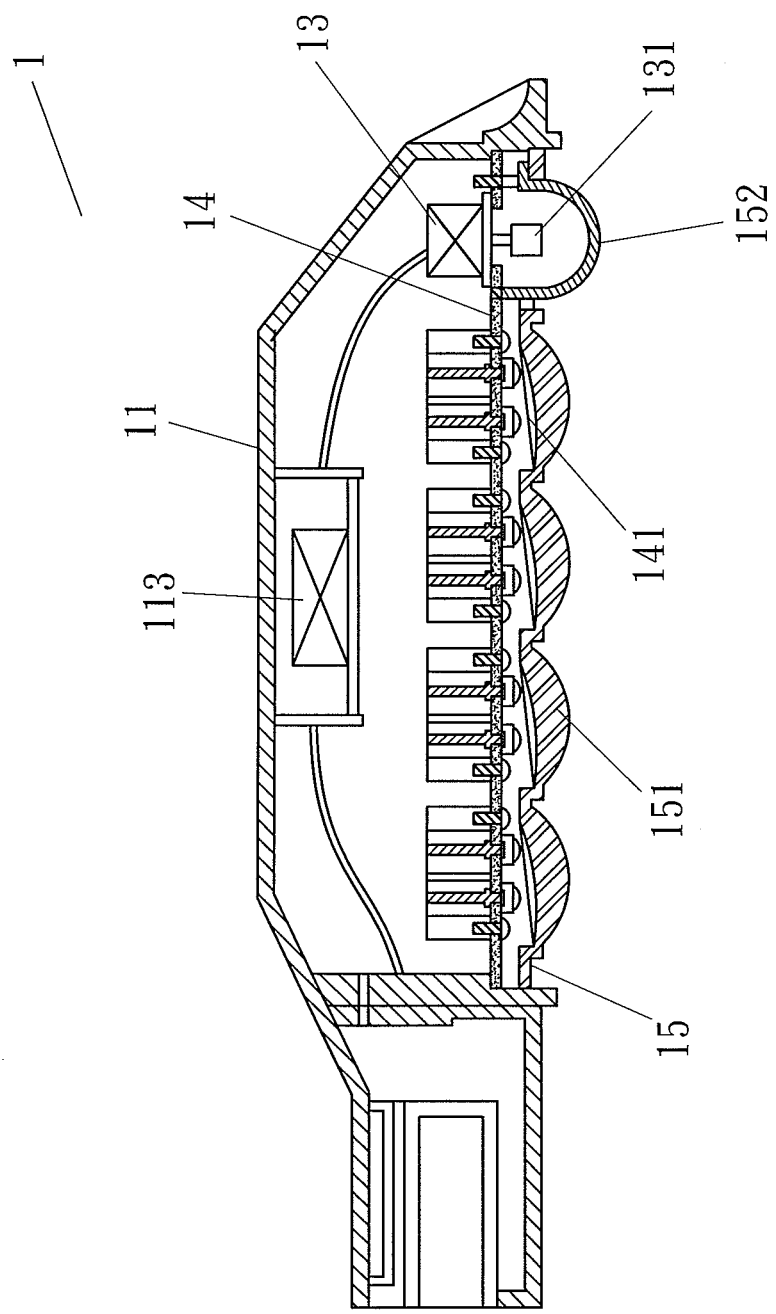
FIG. 14 is a schematic view of a LED lamp of the present invention applied in a lamp for sidewalks.
Figure 15:
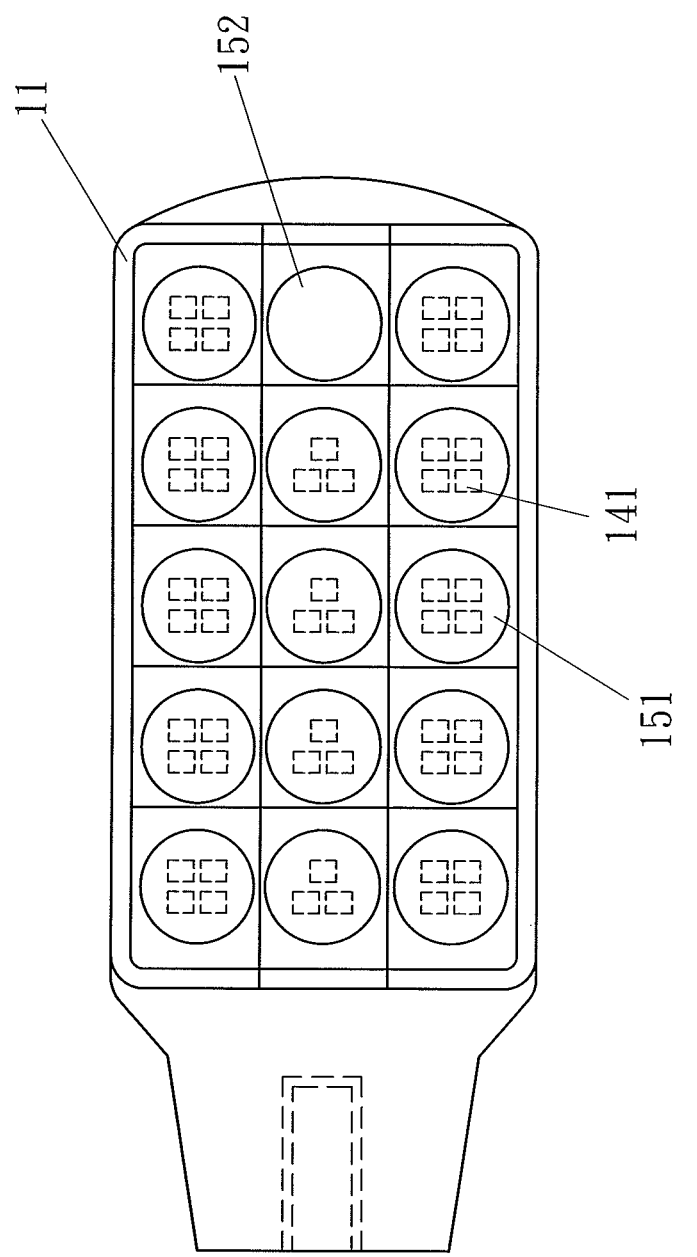
FIG. 15 is a schematic view of a LED lamp of the present invention applied in a lamp for parks.

The intelligent and energy-saving LED lamp 1 of the present invention can have various preferred embodiments. FIG. 10 shows LED lamp 1 further including a sonic emitter 181, a sonic receiver 182, and a LED indicator lamp 183. The sonic emitter 181 is disposed on the lamp holder 11 and connected electrically to a 100% full light electric circuit of the infra-red sensing device 13. The sonic receiver 182 and the LED indicator lamp 183 are installed on locations corresponding to the sonic emitter 181 (e.g. the LED lamp 1 can be installed in vestibule as a vestibule lamp). Accordingly, when the LEDs 141 radiate 100% full light, the sonic receiver 182 receives signals from the sonic emitter 181, and the LED indicator lamp 183 will blink to indicate if there is anyone outside the door to achieve the purpose of alerting. FIG. 11 shows the LED lamp 1 further including a camera 191 and a monitor 192 which is connected electrically to the camera 191. The camera 191 is disposed on the lamp holder 11 to screen the external surrounding to be shown in the monitor 192 for alerting purpose. Furthermore, FIG. 12 shows the LED lamp 1 of the present invention can be applied in LED fluorescent tubes. FIG. 13 shows the LED lamp 1 of the present invention can be applied in horizontal projecting type LED lamps. FIGS. 14 and 15 show the LED lamps 1 of the present invention can also be applied in lamps for sidewalks and parks.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An intelligent and energy-saving LED lamp with glimmer and full light emission comprising, in combination:

a lamp holder including a top end and a bottom end, with an opening formed in the top end and a lamp head disposed on the bottom end of the lamp holder, with an actuator installed in the lamp holder and located above the lamp head;

a control plate installed in the lamp holder and having a control circuit connected electrically to the actuator;

a LED substrate disposed inside the lamp holder and electrically connected to the control circuit of the control plate, with the LED substrate including an upper side facing the opening of the lamp holder and a lower side facing the lamp head, with a plurality of LEDs disposed on the upper side of the LED substrate, with the LED substrate further including a hole extending from the upper side through the lower side of the LED substrate;

an infra-red sensing device disposed inside the lamp holder and electrically connected to the control circuit, with the infra-red sensing device including an infra-red detecting head disposed on an upper end thereof, with the infra-red detecting head extending through the hole of the LED substrate, with the infra-red sensing device further including a sensing circuit for cutting off electric in full light environment, radiating glimmer in environment of low light intensity, and actuating 100% of full light when the infra-red sensing device senses movements of objects; and a lampshade connected to the top end of the lamp holder and covering the opening of the lamp holder, with the lampshade including a protruding cover formed on an outer end of the lampshade and corresponding to the infra-red sensing device;

wherein the plurality of LEDs do not radiate when there is enough light from external surrounding; the actuator actuates the plurality of LEDs to radiate only a preset percentage of light when there is not enough light from external surrounding and the infra-red detecting head does not sense any movements of objects; the plurality of LEDs radiates a full light when there is not enough light from external surrounding and the infra-red detecting head senses movement of objects.

2. The intelligent and energy-saving LED lamp according to claim 1, with a plurality of convex lenses corresponding to the LEDs being formed on the outer end of the lampshade for enhancing light radiated from the plurality of LEDs, and with the lamp holder further including a battery chamber for accommodating batteries.

3. The intelligent and energy-saving LED lamp according to claim 2, further comprising: a sonic emitter, a sonic receiver, and a LED indicator lamp, with the sonic emitter disposed on the lamp holder and connected electrically to a 100% full light electric circuit of the infra-red sensing device, with the sonic receiver receiving signals from the sonic emitter, and with the LED indicator lamp blinking when the LEDs radiate a 100% full light.

4. The intelligent and energy-saving LED lamp according to claim 2, further comprising: a camera and a monitor connected electrically to the camera, and with the camera disposed on the lamp holder to screen the external surrounding to be shown in the monitor.

\* \* \* \* \*